United States Patent
Saumer

(10) Patent No.: US 10,394,576 B2
(45) Date of Patent: Aug. 27, 2019

(54) CONTROL FOR THE SAFE CONTROL OF AT LEAST ONE MACHINE

(71) Applicant: SICK AG, Waldkirch (DE)

(72) Inventor: Markus Saumer, Waldkirch (DE)

(73) Assignee: SICK AG, Waldkirch (DE)

( * ) Notice: Subject to any disclaimer, the term of this patent is extended or adjusted under 35 U.S.C. 154(b) by 13 days.

(21) Appl. No.: 15/783,023

(22) Filed: Oct. 13, 2017

(65) Prior Publication Data

US 2018/0113724 A1 Apr. 26, 2018

(30) Foreign Application Priority Data

Oct. 25, 2016 (EP) ..................................... 16195571

(51) Int. Cl.
*G06F 9/44* (2018.01)
*G06F 9/445* (2018.01)
*G05B 9/02* (2006.01)
*G06F 1/14* (2006.01)
*G06F 13/42* (2006.01)
*G05B 19/042* (2006.01)
*H01R 9/26* (2006.01)

(52) U.S. Cl.
CPC .......... *G06F 9/44505* (2013.01); *G05B 9/02* (2013.01); *G05B 19/0426* (2013.01); *G06F 1/14* (2013.01); *G06F 13/4282* (2013.01); *H01R 9/2625* (2013.01); *G06F 2213/0042* (2013.01)

(58) Field of Classification Search
CPC ............ G05B 19/0423; G05B 19/0426; G05B 19/0428; G06F 13/102
USPC ....................................................... 710/104
See application file for complete search history.

(56) References Cited

U.S. PATENT DOCUMENTS

| | | | | |
|---|---|---|---|---|
| 7,039,811 | B2 * | 5/2006 | Ito | G06F 21/62 711/163 |
| 8,515,563 | B2 * | 8/2013 | Weddingfeld | G05B 19/052 700/2 |
| 8,624,704 | B2 * | 1/2014 | Bornstein | G05B 19/0426 340/3.1 |

(Continued)

FOREIGN PATENT DOCUMENTS

EP 1338935 A1 8/2003

OTHER PUBLICATIONS

European Search Report dated Apr. 18, 2017 in corresponding European Patent Application No. 16195571.1.

*Primary Examiner* — Brian T Misiura
(74) *Attorney, Agent, or Firm* — Nath, Goldberg & Meyer; Jerald L. Meyer; Stanley N. Protigal

(57) ABSTRACT

To enable a fast configuration of a control or of a total plant, a control for the safe control of at least one machine is provided having at least one input unit for receiving input signals from at least one signal generator; having at least one output unit for outputting output signals to the at least one machine; having a control unit for generating the output signals in dependence on the input signals; and having a connection unit having at least one connection socket for connecting an external input device that can be used or configuring the control, wherein the connection unit has at least one connection terminal for connecting the signal generators and/or the machine and is separable from the control and wherein the connection socket can be removed from the connection unit or from the control and comprises a memory with configuration data of the control.

10 Claims, 2 Drawing Sheets

(56) References Cited

U.S. PATENT DOCUMENTS

| | | | | |
|---|---|---|---|---|
| 8,896,999 | B2 * | 11/2014 | Merbreier | G05B 19/0423 |
| | | | | 327/158 |
| 10,127,183 | B2 * | 11/2018 | Thia | G05B 19/4186 |
| 2009/0002135 | A1 * | 1/2009 | Dold | G05B 19/0423 |
| | | | | 340/10.51 |
| 2009/0222107 | A1 * | 9/2009 | Moddemann | H04L 12/40169 |
| | | | | 700/21 |
| 2011/0098830 | A1 * | 4/2011 | Weddingfeld | G05B 9/02 |
| | | | | 700/79 |
| 2015/0045914 | A1 * | 2/2015 | Saumer | G05B 9/02 |
| | | | | 700/79 |
| 2018/0164899 | A1 * | 6/2018 | Saumer | G05B 19/0423 |

\* cited by examiner

CONTROL FOR THE SAFE CONTROL OF AT LEAST ONE MACHINE

FIELD

The invention relates to a control for the safe control of at least one machine.

BACKGROUND

A total plant is made up of a plurality of modules in today's automation industry, with each module having at least one control and at least one machine. A modification of the plant can be carried out simply and in a time-saving manner due to the modular structure of the plant.

The control of the plant controls the machine such that the machine carries out its associated work and optionally interacts with another machine. For this purpose, the control receives input signals from connected signal generators that, for example, reproduce an environment of the machine or a position or a movement of the machine. The control generates output signals that control the machine accordingly and communicates the output signals to the machine.

In this respect, the control comprises configuration data that enable the control to recognize the connected signal generators and machine and to control the functions thereof. These configuration data can be implemented in the control by means of an external input device, for example a computer.

The configuration data are stored in the control in a known manner so that a new implementation of the configuration data in the new control is necessary on a change of the control, with the input device having to be connected to the control. The input device also has to be connected to the control on a modification of the plant or of the work to be carried out by the machine to install the modification on the control.

This requires an input of the configuration data into the control on site or a longer down time of the plant until the control configured with the new configuration data is reinstalled into the plant.

SUMMARY

It is therefore an object of the invention to provide a control for the safe control of a machine with which a fast configuration of the control is possible.

The object is solved in accordance with the invention by a control for the safe control of at least one machine having at least one input unit for receiving input signals from at least one signal generator, having at least one output unit for outputting output signals to the at least one machine, having a control unit for generating the output signals in dependence on the input signals, and having a connection unit with at least one connection socket for connecting an external input device that can be used for configuring the safety control, wherein the connection unit has at least one connection terminal for connecting the signal generators and/or the machine and is separable from the control and wherein the connection socket can be removed from the connection unit or from the control and comprises a memory with configuration data of the control.

In the case of a change of the control, a new control having the configuration data in the memory of the connection socket of the changed control can advantageously be put into operation fast and inexpensively without an external device having to be connected or without a new configuration of the new control having to be carried out. The connection socket only has to be removed from the control to be changed and placed into the new control for this purpose.

All the wiring in the connection unit is hereby provided so that both the connection unit and the control can be manufactured inexpensively.

In accordance with a further preferred embodiment, the connection socket comprises a universal serial bus (USB) connection, a micro-USB connection, a mini-USB connection or comparable connections. These standard connections advantageously provide a general connection option of the most varied types of input devices to the control and an inexpensive manufacture of the connection unit and of the total control.

In accordance with a further preferred embodiment, the connection socket comprises a circuit board on which the memory is provided. It is hereby possible to give the connection socket with the memory a compact design.

In accordance with a preferred embodiment, the connection unit in the connected state in the safety control provides a first connection and a second connection between the connection socket and the control unit. The first connection advantageously provides a connection between the connection socket, the control unit, and the memory as a serial port interface (SPI). The second connection in particular provides a direct USB connection between the connection socket and the control unit. The advantage hereby results that two diverse connections are present within the connection socket for the control a use different communication protocols.

In accordance with a further preferred embodiment, the memory comprises a non-volatile memory such that the implemented configuration data of the control are retained despite a removal of the connection socket from the connection unit or from the control.

The connection socket advantageously comprises a real time clock. Real time information is hereby obtained despite, for example, an exchange of the control for the total plant.

In accordance with a further preferred embodiment, the connection unit comprises its own power supply. The power supply preferably supplies the real time clock with power when the connection unit is separated from the control.

BRIEF DESCRIPTION OF THE DRAWINGS

The invention will also be explained in the following with respect to further advantages and features with reference to the enclosed drawing and to embodiments. The Figures of the drawing show in.

DETAILED DESCRIPTION

Figure 1:
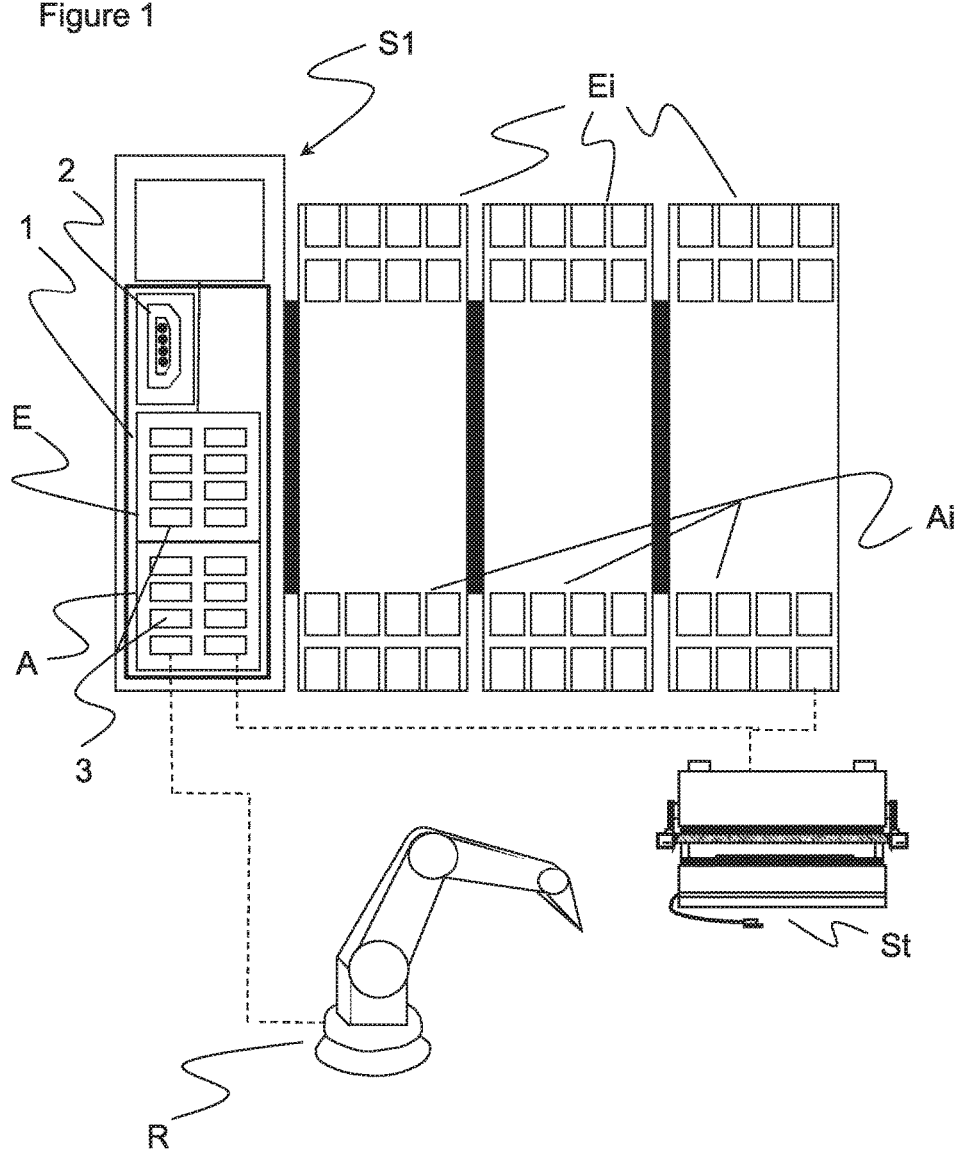
FIG. 1 a schematic representation of a control in accordance with the invention in an automation plant.

FIG. 1 schematically shows an automation plant that is made up of a control S1 in accordance with the invention and of machines controlled by the control S1. The control S1 controls the machines shown by way of example as a robot arm R and as a punch St.

The control S1 controls at least one input unit E to which at least one signal generator, not shown, is connected so that the input unit E receives input signals from the signal generator and provides them to a control unit CPU of the control S1 described in more detail in the following. The input signals are processed by the control unit CPU into corresponding output signals by which the control S1 safely controls the machines R and St. For this purpose, the control unit CPU communicates the output signals to at least one output unit A that directly outputs the output signals to the machines R and St.

The control S1 can be expanded by additional input units and output units Ei and Ai so that the total plant can be expanded in a very simple manner. For this purpose, the additional input units and output units Ei and Ai are connected to the control S1 in accordance with the invention by a bus line.

Figure 3:
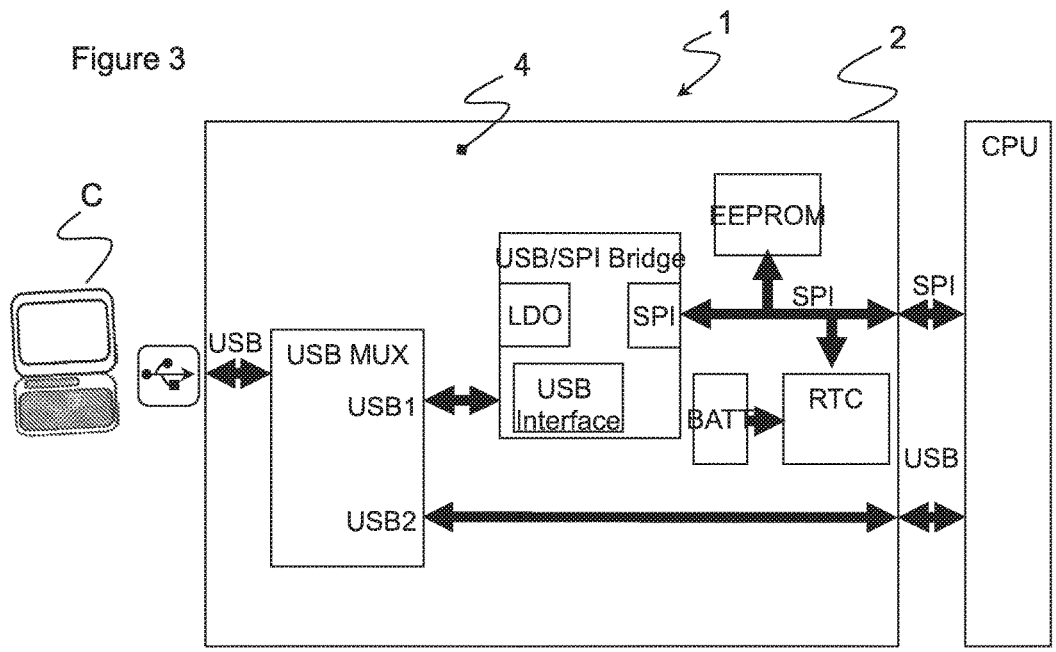
FIG. 3 a schematic, detailed representation of a connection socket in accordance with the invention.

The control S1 furthermore comprises a connection unit 1 that has at least one connection socket 2. The connection socket 2 serves for the connection of an external input device C such as a computer or laptop and as shown in FIG. 3.

Configuration data of the total plant, in particular the assignment of the connections of the control S1 to the connected signal generators and machines R and St and the operating data of the components can be implemented in the control S1 by means of the external input device C so that the control S1 can recognize and control the connected components. In this respect, the connection unit 1 preferably has at least one connection terminal 3 to which the signal generator and/or the machines R and St can be connected.

The connection socket 2 can, in accordance with the invention, be removable from the connection unit 1 or from the control S1 and comprises a memory, preferably a non-volatile memory EEPROM, that will be described in more detail in the following and in which the configuration data of the control S1 are stored. This means that the configuration data of the control S1 input by means of the external input device C are stored in the non-volatile memory EEPROM, with the non-volatile memory EEPROM being integrated in the connection socket 2.

On a change of the control S1, the connection unit 1 together with the connection socket 2 or only the connection socket 2 can be separated from the control S1 and can be inserted into the new control S1 or into the new connection unit 1 of the new control S1 so that the new control S1 can take over all the configuration data from the non-volatile memory EEPROM of the connection socket 2 and can enter into operation without the external input device C having to be connected to and without the configuration data having to be newly input into the new control S1.

It is furthermore possible in accordance with the invention, on a modification of the total plant, for example, in particular of the control S1, to connect the connection socket 2 to the external input device C without the connection unit 1 or the control S1 and to implement the new configuration data directly in the new non-volatile memory EEPROM of the connection socket 2 so that the modification does not have to be carried out on site on the total plant. After the implementation of the modification data in the non-volatile memory EEPROM of the connection socket 2, only an insertion of the connection socket 2 into the connection unit 1 or into the control S1 is required so that the control S1 can take over the configuration data and can enter into operation.

Figure 2:
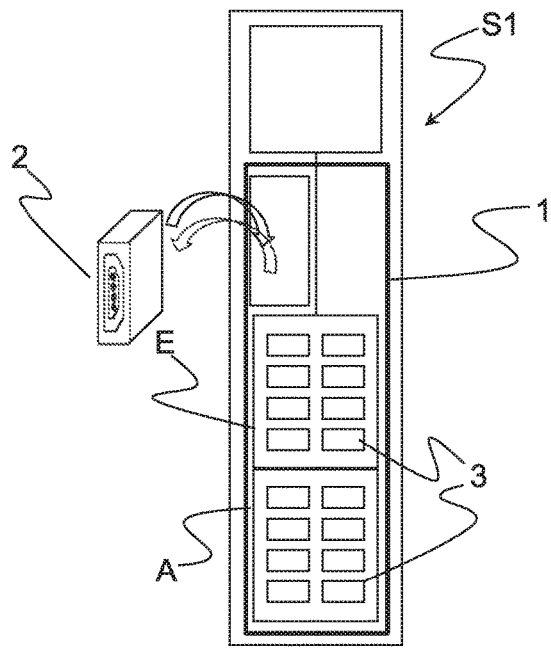
FIG. 2 a schematic representation of an embodiment of the control in accordance with the invention.

An addition or a removal of the connection socket 2 into or out of the control S1 in accordance with the invention is schematically shown in FIG. 2. The connection socket 2 preferably comprises a so-called universal serial bus (USB connection), a micro-USB connection, a mini-USB connection or comparable connections. The connection socket 2 can hereby be connected to the external input device C by means of standardized USB connections and can communicate them to the external input device C by means of standardized transmission protocols.

As shown in the schematic detailed representation of the connection socket 2 in FIG. 3, the connection socket 2 comprises a circuit board 4 on which the non-volatile memory EEPROM is provided. As already mentioned, the configuration data of the control S1 is stored in the non-volatile memory that is, for example, an EEPROM memory. The circuit board 4 has on one side the USB connection that serves for the connection of the connection socket 2 to the external input device C and has on the other side connections to a control unit CPU of the control S1.

The USB connection is branched by means of a multiplexer module (USB MUX) in a first communication path USB1 and in a second communication path USB2. In the connected state in the control S1, i.e. the connection socket 2 is inserted into the control S1, the connection unit 1 or the connection socket 2 provides a first connection and a second connection between the connection socket 2 and the control unit CPU of the control S1. In this respect, the first connection provides a connection between the connector socket 2, the control unit CPU, and the non-volatile memory EEPROM as a serial port interface connection, a so-called SPI connection. The second connection provides a direct USB connection between the connection socket 2 and the control unit CPU of the control S1.

The circuit board 4 of the connection socket 2 thereby has two diverse communication paths to connect the external input device C to the control unit CPU of the control S1. The external input device C can install the configuration data in the non-volatile memory EEPROM of the connection socket 2 over the first communication path USB! or over the first SPI connection and the control unit CPU of the control S1 obtains the configuration data from said non-volatile memory. The external input device C can install the configuration data over the second communication path USB2 in parallel and directly into the control unit CPU of the control S1.

The connection socket 2 furthermore in particular comprises a real time clock RTC that is supplied with power by a power supply BATT provided on the circuit board 4 of the connection socket 2. An energy supply of the real time clock RTC is hereby ensured when the connection socket 2 is separated from the connection unit 1 or from the control S1 or when the control is not supplied with energy.

The real time clock RTC can be set directly by the external input device C over the first communication path USB1 and retains the time information of the total plant even when the control S1 has been replaced.

The power supply BATT preferably comprises a battery or a rechargeable battery that is charged on connection of the external input device C to the USB connection of the connection socket 2 so that the real time clock RTC integrated in the connection socket 2 can be reliably supplied with power.

REFERENCE NUMERAL LIST 1 connection unit
2 connection socket
3 connection terminal
4 circuit board
A, Ai output unit
BATT power supply
C external input device CPU control unit
E, Ei input unit
EEPROM memory
R, St machine (robot arm, punch)
S1 control
SPI serial port interface
USB universal serial bus connection
USB1 first communication path
USB2 second communication path

The invention claimed is:

1. A control for the safe control of at least one machine, the control comprising:
- at least one input unit for receiving input signals from at least one signal generator;
- at least one output unit for outputting output signals to the at least one machine;
- a control unit for generating the output signals in dependence on the input signals; and
- a connection unit having at least one connection socket for connecting an external input device that can be used for configuring the control,
- wherein the connection unit has at least one connection terminal for connecting the signal generators and/or the machine and is separable from the control,
- wherein the connection socket can be removed from the connection unit or from the control and comprises a memory with configuration data of the control,
- and wherein the connection unit in the connected state provides a first connection and a second connection between the connection socket and the control unit in the control.

2. The control in accordance with claim 1, wherein the connection socket comprises a universal serial bus (USB), a micro-USB connection, a mini-USB connection or comparable connections.

3. The control in accordance with claim 1, wherein the connection socket comprises a circuit board on which the memory is provided.

4. The control in accordance with claim 1, wherein the first connection provides a connection between the connection socket, the control unit, and the memory as a serial port interface connection.

5. The control in accordance with claim 1, wherein the second connection provides a direct universal serial bus connection between the connection socket and the control unit.

6. The control in accordance with claim 1, wherein the memory comprises a non-volatile EEPROM memory.

7. The control in accordance with claim 1, wherein the connection socket comprises a real time clock.

8. The control in accordance with claim 7, wherein the connection unit comprises a separate power supply.

9. The control in accordance with claim 8, wherein the power supply supplies the real time clock with power when the connection unit is separated from the control.

10. The control in accordance with claim 1, wherein the connection unit comprises a separate power supply.

* * * * *